(12) United States Patent
Groll et al.

(10) Patent No.: US 7,731,304 B2
(45) Date of Patent: Jun. 8, 2010

(54) ELECTROHYDRAULICALLY REGULATABLE VEHICLE BRAKE SYSTEM WITH TRACTION CONTROL DEVICE

(75) Inventors: Bernd Groll, Oberstdorf (DE); Guenther Schnalzger, Blaichach (DE)

(73) Assignee: Robert Bosch GmbH, Stuttgart (DE)

( * ) Notice: Subject to any disclaimer, the term of this patent is extended or adjusted under 35 U.S.C. 154(b) by 435 days.

(21) Appl. No.: 11/304,644

(22) Filed: Dec. 16, 2005

(65) Prior Publication Data
US 2006/0145532 A1 Jul. 6, 2006

(30) Foreign Application Priority Data
Dec. 16, 2004 (DE) .................. 10 2004 060 529

(51) Int. Cl.
*B60T 8/34* (2006.01)
*B60T 8/40* (2006.01)

(52) U.S. Cl. .............. 303/113.2; 303/113.3; 303/115.1; 303/116.1; 303/116.2; 303/139; 303/87; 303/DIG. 11; 138/30; 138/31

(58) Field of Classification Search ............. 303/113.2, 303/113.3, 115.1, 116.1, 116.2, 139, DIG. 11, 303/87; 138/30, 31
See application file for complete search history.

(56) References Cited
U.S. PATENT DOCUMENTS
4,800,020 A * 1/1989 Savas et al. ................. 210/359

| | | | | |
|---|---|---|---|---|
| 5,188,435 A * | 2/1993 | Willmann | ................ | 303/113.2 |
| 5,354,187 A * | 10/1994 | Holland et al. | .............. | 417/540 |
| 5,363,744 A * | 11/1994 | Pichler | ........................ | 92/242 |
| 5,806,939 A * | 9/1998 | Feigel et al. | ................ | 303/166 |
| 5,921,638 A * | 7/1999 | Higashimura et al. | .... | 303/116.1 |
| 6,065,814 A * | 5/2000 | Nishii et al. | ............. | 303/116.1 |
| 6,203,117 B1 * | 3/2001 | Starr et al. | ..................... | 303/87 |
| 6,267,147 B1 * | 7/2001 | Rago | ........................... | 138/31 |
| 6,363,719 B2 * | 4/2002 | Mohr et al. | ................... | 60/414 |
| 2001/0037834 A1 * | 11/2001 | Shimbori et al. | ............. | 138/31 |
| 2002/0183902 A1 * | 12/2002 | Koerner et al. | ................ | 701/29 |
| 2004/0061376 A1 * | 4/2004 | Yoshino et al. | .......... | 303/113.1 |
| 2004/0084958 A1 * | 5/2004 | Ariki et al. | .............. | 303/116.1 |

\* cited by examiner

*Primary Examiner*—Bradley T King
*Assistant Examiner*—Mahbubur Rashid
(74) *Attorney, Agent, or Firm*—Ronald E. Greigg

(57) ABSTRACT

The invention relates to an electronically regulatable vehicle brake system with traction control, in which a master cylinder is connected indirectly via a hydraulic unit to at least one wheel brake. The hydraulic unit has electromagnet valves and an externally triggerable pressure generator, for modulating the wheel brake pressure, optionally independently of the driver. For preventing wheel slip, the pressure generator is connected by its intake side to an intake conduit, among other things, that is controllable by an intake valve. To enhance the dynamics and improve the regulatability of a vehicle brake system, a self-aspirating pressure fluid storage unit is connected to the intake conduit and makes an aspiration volume available to the pressure generator.

19 Claims, 2 Drawing Sheets

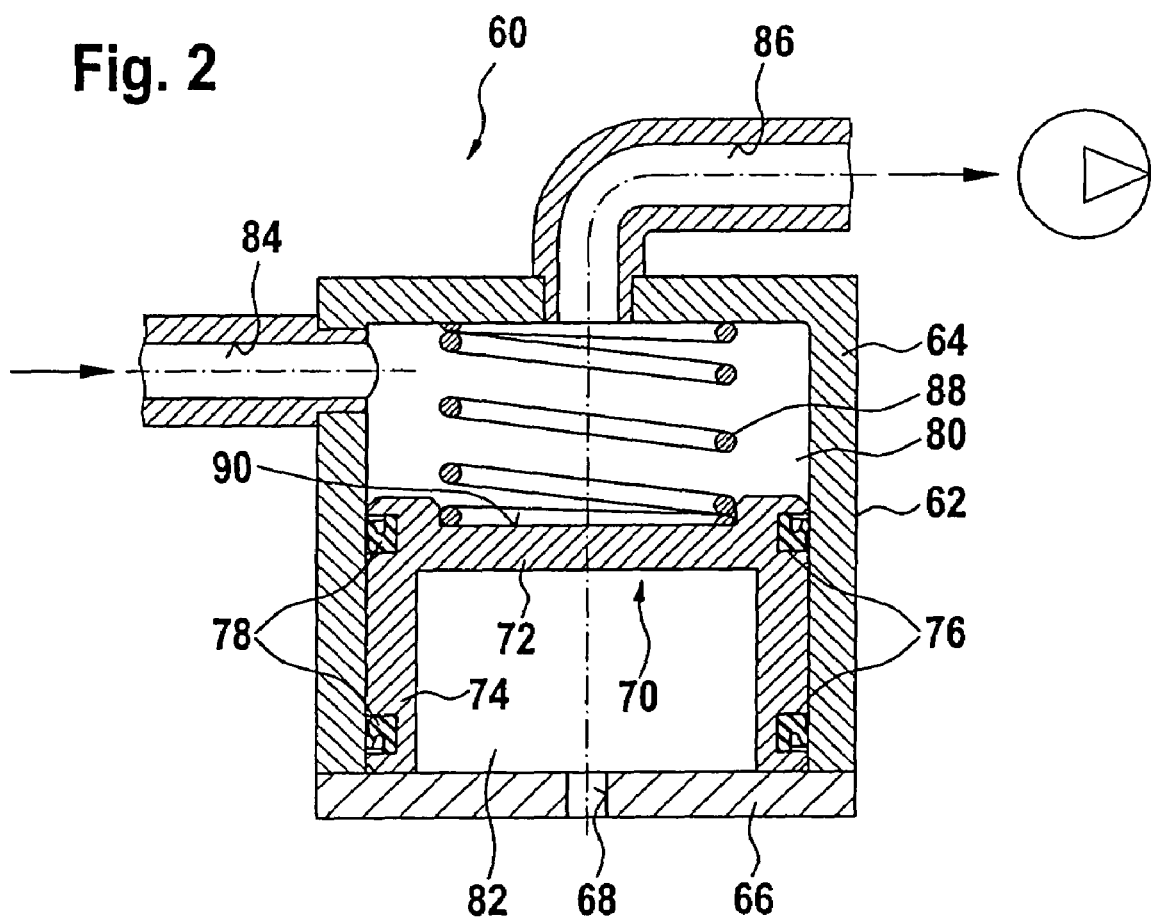

ELECTROHYDRAULICALLY REGULATABLE VEHICLE BRAKE SYSTEM WITH TRACTION CONTROL DEVICE

CROSS-REFERENCE TO RELATED APPLICATIONS

This application is based on German Patent Application 10 2004 060 529.7 filed on Dec. 16, 2004, upon which priority is claimed.

BACKGROUND OF THE INVENTION

1. Field of the Invention

The invention relates to an improved electronically regulatable vehicle brake system with traction control, of the kind shown in a hydraulic circuit diagram in FIG. 1 of German Patent Disclosure DE 196 39 563 A1, for example.

2. Description of the Prior Art

The known electronically regulatable vehicle brake system mentioned above has a master cylinder, which is actuated by the driver and connected indirectly to a hydromechanical wheel brake via a so-called hydraulic unit. The hydraulic unit receives electromagnet valves and an externally drivable pressure generator, in order to modulate the brake pressure individually at each wheel. For this purpose, the pressure generator is connected by its intake side to an intake line that leads to the master cylinder, and this intake line is controllable by means of a triggerable switching valve. Brake pressure modulation can optionally be done independently of the driver. The goal of this is for any wheel slip that occurs at the wheels of the vehicle to be avoided by means of a brake pressure buildup or reduction, since when wheel slip occurs, unstable driving states may be involved that can be controlled by the driver only with difficulty. Triggering the components of the hydraulic unit is done by means of an electronic control unit, which for the purpose assesses measurement parameters, from wheel rotation or pressure sensors, among others, and converts them into appropriate trigger signals.

A disadvantage of the electronically regulatable vehicle brake system with traction control is that the speed at which a buildup of a brake pressure by the pressure generator takes place is too slow for certain brake pressure regulating functions, especially at low ambient temperatures, when the pressure fluid has high viscosities. Moreover, the flow cross sections in the system represent hydraulic resistances that must be overcome by the pressure generator. Particularly the cross sections of the brake lines cannot be increased arbitrarily, because otherwise difficulties arise in bending and handling such brake lines during vehicle assembly.

OBJECTS AND SUMMARY OF THE INVENTION

By comparison, an electronically regulatable vehicle brake system with traction control according to this invention has the advantage that the speed with which a brake pressure buildup takes place is increased. At the same time, the requisite brake pressure regulation can be performed more sensitively. To that end, according to the invention, a self-aspirating pressure fluid storage unit which makes an aspiration volume available is located upstream of the pressure generator. This pressure fluid storage unit minimizes the existing intake resistance for the pressure generator. This in turn optionally makes it possible to reduce the required brake line cross sections and therefore reduces costs. Because of the use of standard components, the invention can be realized inexpensively and in a way that facilitates assembly. The pressure fluid storage unit can be integrated in a hydraulic unit in a way that saves installation space, or it can be added by retrofitting as a separate component. Further advantages or advantageous refinements of the invention are disclosed.

A self-aspirating pressure fluid storage unit can be embodied especially simply and effectively as a cylinder-piston unit, in which a piston is pressed to a block by an elastic element against a mechanical end stop of a cylinder. Thus integrating a pressure fluid storage unit with a vehicle brake system does not increase the elasticity that occurs in a brake circuit. The elastic element is located in a first pressure chamber, through which pressure fluid of the vehicle brake system flows, and this pressure chamber is separated by the piston from a second, gas-filled pressure chamber. For more-effective sealing off of the two pressure chambers from one another, conventional sealing rings, preferably lip seal rings, can be inserted into annular grooves of the piston. The pressure fluid storage unit functions purely mechanically and makes do without any additional electrical triggering. Because of the immediate proximity of the pressure fluid storage unit to the pressure generator, its driving power can be employed largely entirely for the pressure buildup in the vehicle brake system.

BRIEF DESCRIPTION OF THE DRAWING

The invention will be better understood and further objects and advantages thereof will become more apparent from the ensuing detailed description of a preferred embodiment taken in conjunction with the drawing, in which:

FIG. 2 shows the pressure fluid storage unit, on which the invention is based, in longitudinal section.

DESCRIPTION OF THE PREFERRED EMBODIMENT

Figure 1:
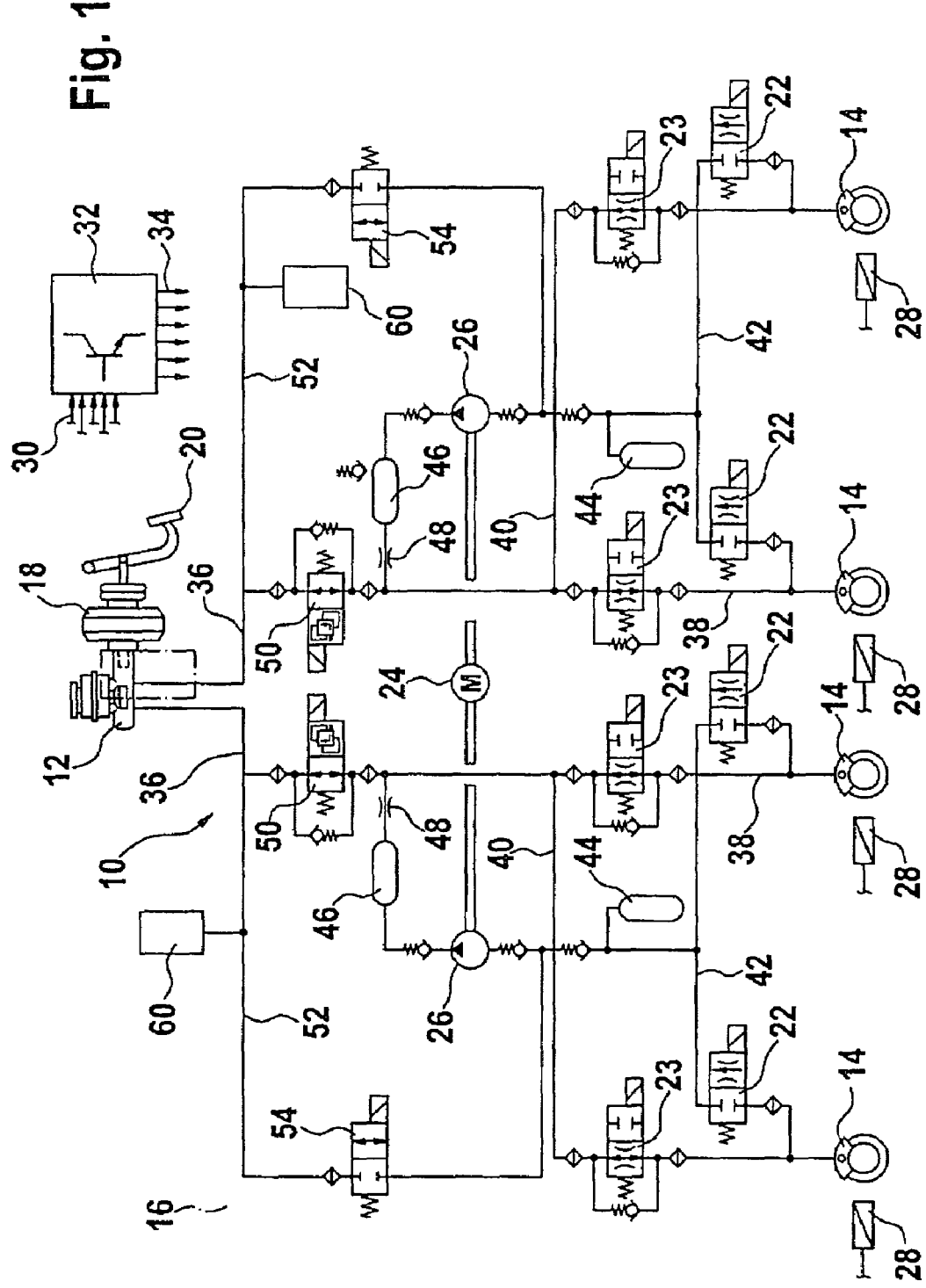
FIG. 1 shows an electronically regulatable vehicle brake system, refined according to the invention, with traction control in a hydraulic circuit diagram.

The electronically regulatable vehicle brake system 10 with traction control shown in FIG. 1 includes a master cylinder 12 and a total of four hydromechanical wheel brakes 14, which are connected to a hydraulic unit 16. The master cylinder 12 is actuatable by the driver of a vehicle equipped with such a vehicle brake system 10 via a brake booster 18 by means of a brake pedal 20. Among other elements, electromagnet valves 22, 23, 50, 54 and a pressure generator 26 that can be driven by an externally triggerable drive motor 24 are located in the hydraulic unit 16. Rotation sensors 28 on the vehicle wheels detect the wheel rpm and carry these measurement data 30 to an electronic control unit 32. From the change in rpm over time, the control unit ascertains trigger signals 34 for the electromagnet valves 22, 23, 50, 54 and the drive motor 24 of the hydraulic unit 16, in order to build up a brake pressure or reduce it individually for each wheel as needed. The vehicle brake system 10 is therefore capable of avoiding any incident slip at the vehicle wheels by means of purposefully varying the brake pressure of the particular affected wheel.

Two brake circuits 36, each associated with two wheel brakes 14, are connected to the master cylinder 12. Inside the hydraulic unit 16, the two brake circuits 36 branch off into two brake circuit branches 38, 40 each. Each of these brake circuit branches 38, 40 ends in one of the two wheel brakes 14, and each wheel brake 14 is preceded by a pressure modulating device, comprising a pressure buildup valve 22 and a pressure reduction valve 23. The pressure buildup valve 22 is a 2/2- way switchover valve, which is open in its basic position, while the pressure reduction valve 23, while also embodied as a 2/2-way switchover valve, is normally closed and can be switched over to its open position by electrical triggering. In its electrically triggered state, the pressure reduction valve 23 carries pressure fluid from the respective wheel brake 14 away into a return 42. Located in this return 42 are a low-pressure reservoir 44, the aforementioned pressure generator 26 hydraulically downstream of the low-pressure reservoir 44, a high-pressure reservoir 46 downstream of the pressure generator 26, and a throttle 48 downstream of this high-pressure reservoir 46. Downstream of this throttle 48, the return 42 discharges back into the brake circuit 36. Upstream of this discharge point of the return 42 into the brake circuit 36, there is also a switchover valve 50, which connects the master cylinder 12 to the brake circuit 36, or in its triggered state decouples it from the brake circuit 36. Aside from this, an intake conduit 52 in the hydraulic unit 16 finally connects the intake side of the pressure generator 26 to the master cylinder 12. This intake conduit 52 is controllable by an intake valve 54, embodied as a normally blocking 2/2-way switching valve, which to this end can be switched over by electrical triggering to its open position. When the switchover valve 50 is blocking and the intake valve 54 is open, the pressure generator 26 can aspirate pressure fluid from the master cylinder 12, in order—on the condition that the pressure buildup valves 22 are open and the pressure reduction valves 23 are closed—to build up a brake pressure in a wheel brake 14 that communicates with the brake circuit 36. In the event of driving stability control, this can be done independently of the actuation of the master cylinder 12 by the driver.

In the normal braking mode, the electromagnet valves 22, 23, 50, 54 are in their basic position as shown. A brake pressure buildup in the wheel brakes 14 then takes place by actuation of the brake pedal 20 via the opened switchover valve 50 and the likewise opened pressure buildup valves 22. If one of the wheels of a brake circuit 36 threatens to lock, then by electrical triggering of one of the pressure reduction valves 23, the brake pressure of the affected wheel is reduced. In that case, the then likewise-activated pressure generator 26 aspirates pressure fluid from the wheel brakes 14 and feeds this pressure fluid back into the brake circuit 36 upstream of the then-closed pressure buildup valve 22.

According to the invention, the electronically regulatable vehicle brake system 10 of FIG. 1 has one pressure fluid storage unit 60 per brake circuit 36. These pressure fluid storage units 60 are each connected to the intake conduit 52 between the master cylinder 12 and the intake valve 54; the master cylinder 12, the pressure fluid storage unit 60, and the intake valve 54 are each connected to one another in series. The pressure fluid storage unit 60 may be integrated with the hydraulic unit 16, or it may be connected as a separate unit to the hydraulic unit 16. The brake circuits 36 of FIG. 1 show both variants as alternatives side by side. When the intake valve 54 is open, the pressure fluid storage unit 60 makes an aspiration volume available to the pressure generator 26 that speeds up the startup of the pressure generator and thus speeds up the brake pressure buildup in the vehicle brake system 10. FIG. 2 shows one possible structural design for the pressure fluid storage unit 60.

The pressure fluid storage unit 60 in FIG. 2 is embodied as a cylinder-piston unit. The cylinder 62 is formed by a housing in the form of a hollow body, which comprises a basic housing body 64 that is closed on one end and a cap 66 that closes the opposite end of the housing body 64. The cap 66 can be screwed, glued, wedged, or similarly connected to the basic housing body 64 and has a centrally located through opening 68 leading to the environment. A cup-shaped piston 70 is guided axially movably in the interior of the housing. This piston 70 has a piston bottom 72 and a piston shaft or wall 74 embodied integrally with the piston bottom and may be made from metal or plastic by creative shaping, injection molding, or metal-cutting machining. In the basic position shown, the piston shaft 74 rests with its face end, facing away from the piston bottom 72, on the cap 66 of the cylinder 62. On both ends of the piston 70, lip seal rings 78 are inserted into annular grooves 76 that are open toward the outside. Because of these lip seal rings 78, two pressure chambers 80, 82 are sealed off in gastight fashion from one another by the piston 70. A first pressure chamber 80, toward the piston bottom, has pressure fluid of the vehicle brake system 10 flowing through it. To that end, an inflow connection 84 is located on the circumferential surface of the basic housing body 64. An outflow connection 86 is located on the bottom face of the basic housing body 64 that closes off the first pressure chamber 80. Alternatively, the pressure fluid storage unit 60, instead of separate connections 84, 86 for supplying pressure fluid, may have only one common central connection, as is shown in FIG. 1. FIG. 2, which shows the pressure fluid storage unit 60 in its installed position, shows that the two connections 84, 86 discharge into the first pressure chamber 80 at the highest point. This assures the venting of the pressure chamber. The part of the intake conduit 52 that leads toward the master cylinder 12 is connected to the inflow connection 84, while the outflow connection 86, via the intake valve 54, communicates directly with the intake side of the pressure generator 26 of the vehicle brake system 10 of FIG. 1.

In the first pressure chamber 80 that receives pressure fluid, a spring 88 is located with prestressing and is braced on the bottom face of the basic housing body 64 and diametrically opposite on the piston bottom 72. To that end, the piston bottom 72 is provided with a central countersunk recess 90, which is adapted in its diameter to the outer diameter of the spring 88. The spring 88 presses the piston 70 to a block against the cap 66 of the cylinder 64. The cap 66 thus represents an end stop for the piston motion. The piston interior, together with the cap 66, defines the second pressure chamber 82, which is ventilated via the through opening 68 in the cap 66 to the environment, or in other words is gas-filled.

The pressure fluid storage unit 60 described has the following effect within the electronically regulatable vehicle brake system 10 of FIG. 1:

Upon electronic triggering of the drive of the pressure generator 26, triggering of the intake valve 54 occurs simultaneously. The latter valve therefore switches to its open position. Thus the first pressure chamber 80 of the pressure fluid storage unit 60 is acted upon by the underpressure generated by the pressure generator 26. This underpressure causes the piston 70 to move upward in terms of FIG. 2, in the direction of the housing bottom. The first pressure chamber 80 decreases its volume in the process and makes pressure fluid available to the pressure generator 26 accordingly. Since the communication from the first pressure chamber 80 to the intake side of the pressure generator 26 takes place over a direct route, the pressure generator 26 can aspirate pressure fluid comparatively simply and with little flow resistance. The pressure generator 26 starts up and builds up a brake pressure in the brake circuit 36 correspondingly fast.

Upon a retraction of the triggering of the drive of the pressure generator 26 and of the intake valve 54, the underpressure operative in the first pressure chamber 80 collapses, and the spring 88 located in the first pressure chamber 80 presses the piston 70 back into its basic position shown in FIG. 1. Because of the increasing volume of the first pressure chamber that occurs in the process, pressure fluid is aspirated from the master cylinder 12 and is kept in reserve for another triggering of the drive of the pressure generator 26 and intake valve 54. The pressure fluid storage unit 60 operates in self-aspirating fashion accordingly.

It is understood that changes or additions may be made to the exemplary embodiment described without departing from the fundamental concept of the invention. In this respect, it should be noted that instead of a rigid piston 70 as a separator element between the two pressure chambers 80, 82, a spring-loaded diaphragm or the like may be used.

The foregoing relates to a preferred exemplary embodiment of the invention, it being understood that other variants and embodiments thereof are possible within the spirit and scope of the invention, the latter being defined by the appended claims.

We claim:

1. An electrohydraulically regulatable vehicle brake system (10) with traction control, comprising
   a master cylinder (12),
   a wheel brake (14),
   a hydraulic unit connected (16) between the master cylinder (12) and the wheel brake (14), the hydraulic unit having electromagnet valves (22, 23, 50, 54) and an externally triggerable pressure generator (26) for individual-wheel regulation of the brake pressure at the wheel brakes (14) as a function of an incident wheel slip,
   an intake conduit (52) controllable by an intake valve (54) and connecting the intake side of the pressure generator (26) to the master cylinder (12), and
   a self-aspirating pressure fluid storage unit (60) connected to the intake conduit and furnishing an aspiration volume to the pressure generator,
   wherein the pressure fluid storage unit (60) has a first pressure chamber (80) filled with hydraulic pressure fluid of the wheel brake, a separator element that is urged by an elastic element (88) in the direction of a basic position, in which the pressure chamber (80) filled with hydraulic pressure fluid is at its maximum volume, and a second pressure chamber (82) ventilated to outside of the pressure fluid storage unit (60), wherein the separator element (70) is disposed between the first pressure chamber and the second pressure chamber.

2. The electrohydraulically regulatable vehicle brake system in accordance with claim 1, wherein the pressure fluid storage unit is connected to the intake conduit between the master cylinder and the intake valve.

3. The electrohydraulically regulatable vehicle brake system in accordance with claim 1, wherein the pressure fluid storage unit comprises a cylinder-piston unit having a piston guided axially movable in a cylinder, the piston dividing a first pressure chamber, which can be filled with hydraulic pressure fluid of the vehicle brake system, from a second pressure chamber in a pressure-fluid-tight fashion, and a prestressed elastic element located in the first pressure chamber urging the piston in the direction of a mechanical end stop of the cylinder.

4. The electrohydraulically regulatable vehicle brake system in accordance with claim 2, wherein the pressure fluid storage unit comprises a cylinder-piston unit having a piston guided axially movable in a cylinder, the piston dividing a first pressure chamber, which can be filled with hydraulic pressure fluid of the vehicle brake system, from a second pressure chamber in a pressure-fluid-tight fashion, and a prestressed elastic element located in the first pressure chamber urging the piston in the direction of a mechanical end stop of the cylinder.

5. The electrohydraulically regulatable vehicle brake system in accordance with claim 3, further comprising at least one sealing element on the outer circumference of the piston and mutual sealing off of the two pressure chambers.

6. The electrohydraulically regulatable vehicle brake system in accordance with claim 4, further comprising at least one sealing element on the outer circumference of the piston and mutual sealing off of the two pressure chambers.

7. The electrohydraulically regulatable vehicle brake system in accordance with claim 5, wherein said least one sealing element comprises two lip seal rings each located in an encompassing annular groove in the end regions of the piston, which grooves each block in the region of the respective pressure chamber facing away from them.

8. The electrohydraulically regulatable vehicle brake system in accordance with claim 6, wherein said least one sealing element comprises two lip seal rings each located in an encompassing annular groove in the end regions of the piston, which grooves each block in the region of the respective pressure chamber facing away from them.

9. The electrohydraulically regulatable vehicle brake system in accordance with claim 3, wherein the cylinder is formed of a basic housing body which is closed on one end and which on its second end is closed by a cap, and wherein the cap has at least one through opening toward the environment, which through opening discharges into the second pressure chamber.

10. The electrohydraulically regulatable vehicle brake system in accordance with claim 5, wherein the cylinder is formed of a basic housing body which is closed on one end and which on its second end is closed by a cap, and wherein the cap has at least one through opening toward the environment, which through opening discharges into the second pressure chamber.

11. The electrohydraulically regulatable vehicle brake system in accordance with claim 7, wherein the cylinder is formed of a basic housing body which is closed on one end and which on its second end is closed by a cap, and wherein the cap has at least one through opening toward the environment, which through opening discharges into the second pressure chamber.

12. The electrohydraulically regulatable vehicle brake system in accordance with claim 3, wherein the piston comprises a hollow piston with a piston shaft and a piston bottom, and wherein the piston shaft is located facing away from the elastic element.

13. The electrohydraulically regulatable vehicle brake system in accordance with claim 4, wherein the piston comprises a hollow piston with a piston shaft and a piston bottom, and wherein the piston shaft is located facing away from the elastic element.

14. The electrohydraulically regulatable vehicle brake system in accordance with claim 13, wherein the elastic element comprises at least one spring, braced between the closed end of the cylinder and the bottom of a countersunk recess on the piston bottom, and wherein the countersunk recess and the spring are adapted to one another in their diameters.

15. The electrohydraulically regulatable vehicle brake system in accordance with claim 3, wherein the piston is produced by injection molding from plastic.

16. The electrohydraulically regulatable vehicle brake system in accordance with claim 1, wherein the cylinder-piston unit comprises an inflow connection communicating with the master cylinder and an outflow connection communicating indirectly with the pressure generator, said inflow and outflow connections discharging at separate sides and at the highest point into the interior of the first pressure chamber.

17. The electrohydraulically regulatable vehicle brake system in accordance with claim 3, wherein the end stop for the piston is formed by a cap of the cylinder; and wherein the piston, in its basic position, rests as a block, with an open face end which faces away from the piston bottom, resting on the cap.

18. The electrohydraulically regulatable vehicle brake system in accordance with claim 1, wherein the vehicle brake system comprises two separate brake circuits; and wherein each brake circuit is equipped with at least one pressure fluid storage unit.

19. The electrohydraulically regulatable vehicle brake system in accordance with claim 3 wherein the vehicle brake system comprises two separate brake circuits; and wherein each brake circuit is equipped with at least one pressure fluid storage unit.

* * * * *